(12) United States Patent
Thompson

(10) Patent No.: US 9,260,129 B2
(45) Date of Patent: Feb. 16, 2016

(54) SKI ATTACHMENT FOR A PORTABLE COOLER

(71) Applicant: Kevin M. Thompson, New Palestine, IN (US)

(72) Inventor: Kevin M. Thompson, New Palestine, IN (US)

( * ) Notice: Subject to any disclaimer, the term of this patent is extended or adjusted under 35 U.S.C. 154(b) by 0 days.

(21) Appl. No.: 14/301,852

(22) Filed: Jun. 11, 2014

(65) Prior Publication Data

US 2015/0360710 A1 Dec. 17, 2015

(51) Int. Cl.
*B62B 13/18* (2006.01)
*B62B 19/04* (2006.01)
*F25D 3/08* (2006.01)

(52) U.S. Cl.
CPC .. *B62B 19/04* (2013.01); *F25D 3/08* (2013.01)

(58) Field of Classification Search
CPC ........ B62B 19/00; B62B 19/02; B62B 19/04; B62B 19/06; B62B 2204/06
USPC ................. 280/10, 8, 9, 11, 23.1, 28.12, 845, 280/47.131, 47.17
See application file for complete search history.

(56) References Cited

U.S. PATENT DOCUMENTS

| | | | |
|---|---|---|---|
| 3,851,891 A * | 12/1974 | Liu | 280/11 |
| 3,927,894 A | 12/1975 | Zawislak | |
| 4,163,564 A * | 8/1979 | Kramer | 280/10 |
| 4,191,391 A * | 3/1980 | Dorlini | 280/9 |
| 4,251,085 A * | 2/1981 | Lageer et al. | 280/10 |
| 4,307,892 A * | 12/1981 | Miles | 280/9 |
| 4,589,668 A * | 5/1986 | Mares | 280/8 |
| 4,618,157 A | 10/1986 | Resnick | |
| 4,778,190 A * | 10/1988 | Meredith | 280/7.12 |
| 4,976,448 A * | 12/1990 | Wickersham et al. | 280/47.2 |
| 5,169,164 A * | 12/1992 | Bradford | 280/35 |
| 5,222,748 A | 6/1993 | Johnson | |
| 5,249,438 A | 10/1993 | Rhaney et al. | |
| 5,620,191 A | 4/1997 | Sayette | |
| 5,911,422 A * | 6/1999 | Carpenter et al. | 280/8 |
| 6,042,122 A * | 3/2000 | Mohr | 280/9 |
| 6,474,097 B2 * | 11/2002 | Treppedi et al. | 62/457.7 |
| 6,533,298 B2 * | 3/2003 | Sims | 280/47.26 |
| 6,782,711 B2 | 8/2004 | Abfalter | |
| 7,207,576 B1 * | 4/2007 | Ibarra | 280/47.21 |
| 7,464,943 B1 | 12/2008 | Poggioli et al. | |
| 7,481,065 B2 | 1/2009 | Krieger | |
| 8,256,156 B1 | 9/2012 | Burgoyne, Jr. | |
| 9,022,395 B1 * | 5/2015 | Vanderberg | 280/47.26 |
| 9,027,939 B2 * | 5/2015 | Love | 280/13 |
| 9,199,657 B2 * | 12/2015 | Martin | |
| 2008/0106054 A1 * | 5/2008 | Autry | 280/47.315 |
| 2013/0277927 A1 | 10/2013 | Harvey | |
| 2015/0239483 A1 * | 8/2015 | Floyd | 280/47.131 |

* cited by examiner

*Primary Examiner* — James M Dolak
(74) *Attorney, Agent, or Firm* — Kyle S. Brant

(57) ABSTRACT

A ski attachment device for a portable cooler is disclosed. The ski attachment device includes a u-shaped rod that is positioned over a vertically extendable handle of the cooler. The rod is attached to a support member at the lower free ends of the rod. The free ends of the rod include threaded portions over which knobs are attached to secure the support member in a particular vertical position with respect to the cooler. A wide ski is hingedly attached to the support member. The ski is pivotally positioned in a lowered position so that the curved portion of the ski is situated beneath wheels attached to the under side of the cooler. The ski is also positionable in a raised position. A flexible strap having a buckle is attached to the support member and encircles the periphery of the cooler.

13 Claims, 5 Drawing Sheets

SKI ATTACHMENT FOR A PORTABLE COOLER

FIELD OF THE INVENTION

This invention relates in general to portable thermal insulation containers used to maintain food at a cold or warm temperature and more particularly to a ski attachment for use with a portable thermal insulation container.

BACKGROUND OF THE INVENTION

Thermally insulated containers used for transporting food from one location to another are well known in the prior art. As far back as ancient times, man has faced a never ending need for a thermally insulated container useful in transporting small quantities of food or beverages while maintaining the temperature thereof for the sake of preserving the food as long as possible at a desired temperature. In more recent decades, light weight materials have led to thermally insulated containers or "coolers" that are much lighter and more readily transported from one location to another. The addition of wheels to the underside of modern coolers has significantly reduced the physical effort required for transport of heavy coolers from place to place. Further to the improvement of cooler innovations, the addition of telescoping retractable handles similar to those found on luggage and large briefcases has provided a more convenient means for handling a cooler. However, wheels on the underside of a cooler are only useful on a firm smooth surface. Wheeled coolers are fairly difficult to transport or "drag" across a sandy beach or loose soil area due to the significant friction based resistance to movement developed between the wheels and cooler external surfaces as these cooler components come in contact with the loose soil beneath the cooler.

What is needed is a ski attachment device that is easily attached to a wheeled cooler and that provides a ski-like surface interposed between the cooler and the ground beneath the cooler that reduces the frictional drag between the cooler and the ground during transport across a loose soil area. Further, the ski attachment device should be easily attached and configured for the particular dimensions of any cooler with minimal effort yet readily removed for storage when surface conditions do not require such ski-like functionality. In addition, the device should include user configurable positions for the ski to enable repositioning of the ski into a standby position in locations where the ski is not required.

SUMMARY OF THE INVENTION

A ski attachment device for a portable cooler having at least two wheels rotatably mounted beneath the cooler and a vertically extendable handle attached to one vertical side of the cooler, the ski attachment device, according to one aspect of the present invention, comprises a beam, mounting means attached to the beam for removably mounting the beam on the cooler, and ski means for providing a ski surface beneath the wheels of the cooler, the ski means pivotally attached to the beam and positionable in a lowered position to provide a ski surface beneath the wheels of the cooler, the ski means also pivotally positionable in a raised position whereby the wheels of the cooler contact the ground beneath the cooler.

DESCRIPTION OF THE PREFERRED EMBODIMENT

Figure 1:
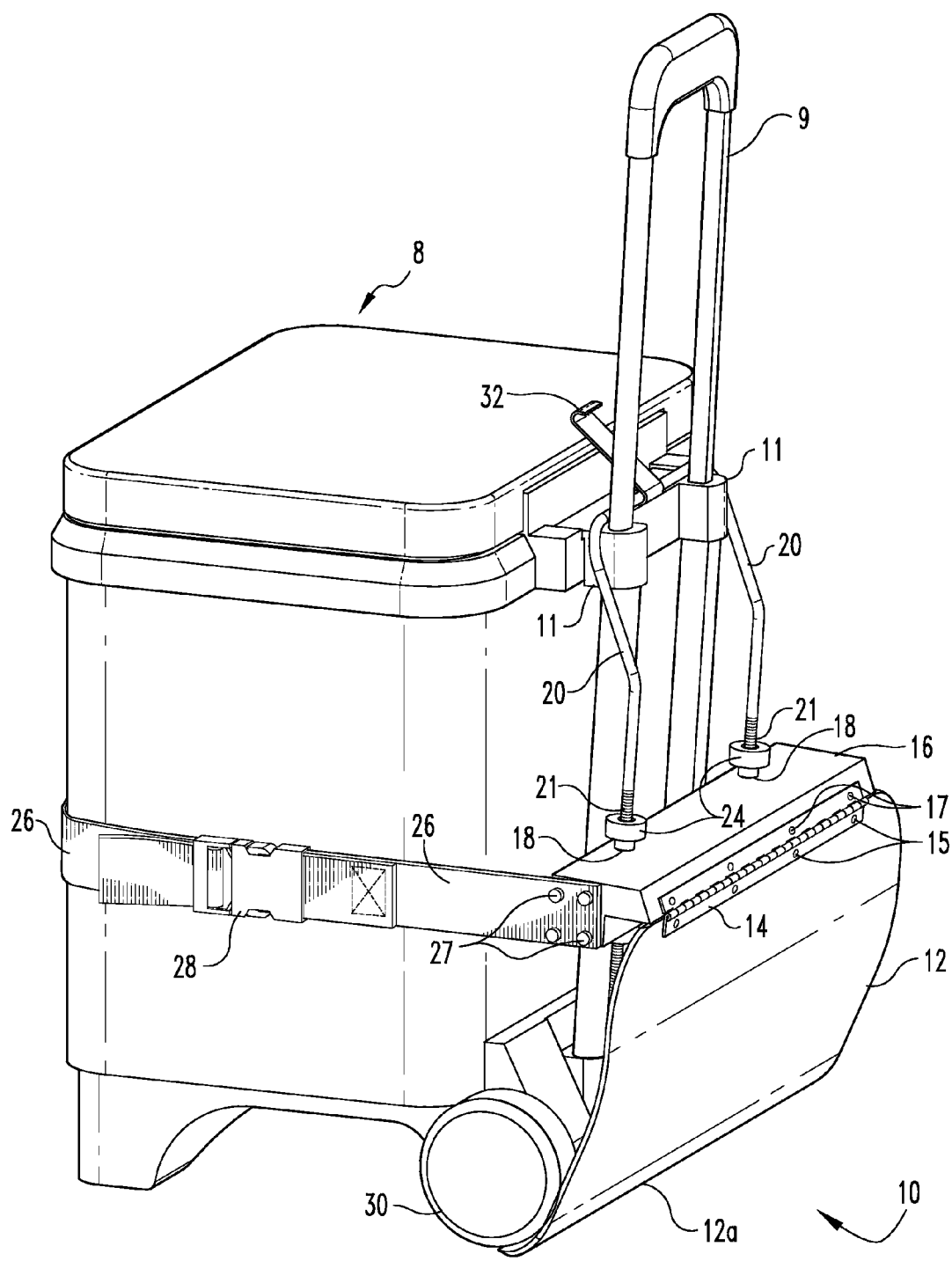
FIG. 1 is a perspective view of a ski attachment for a portable cooler according to the present invention shown mounted on a prior art wheeled cooler.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
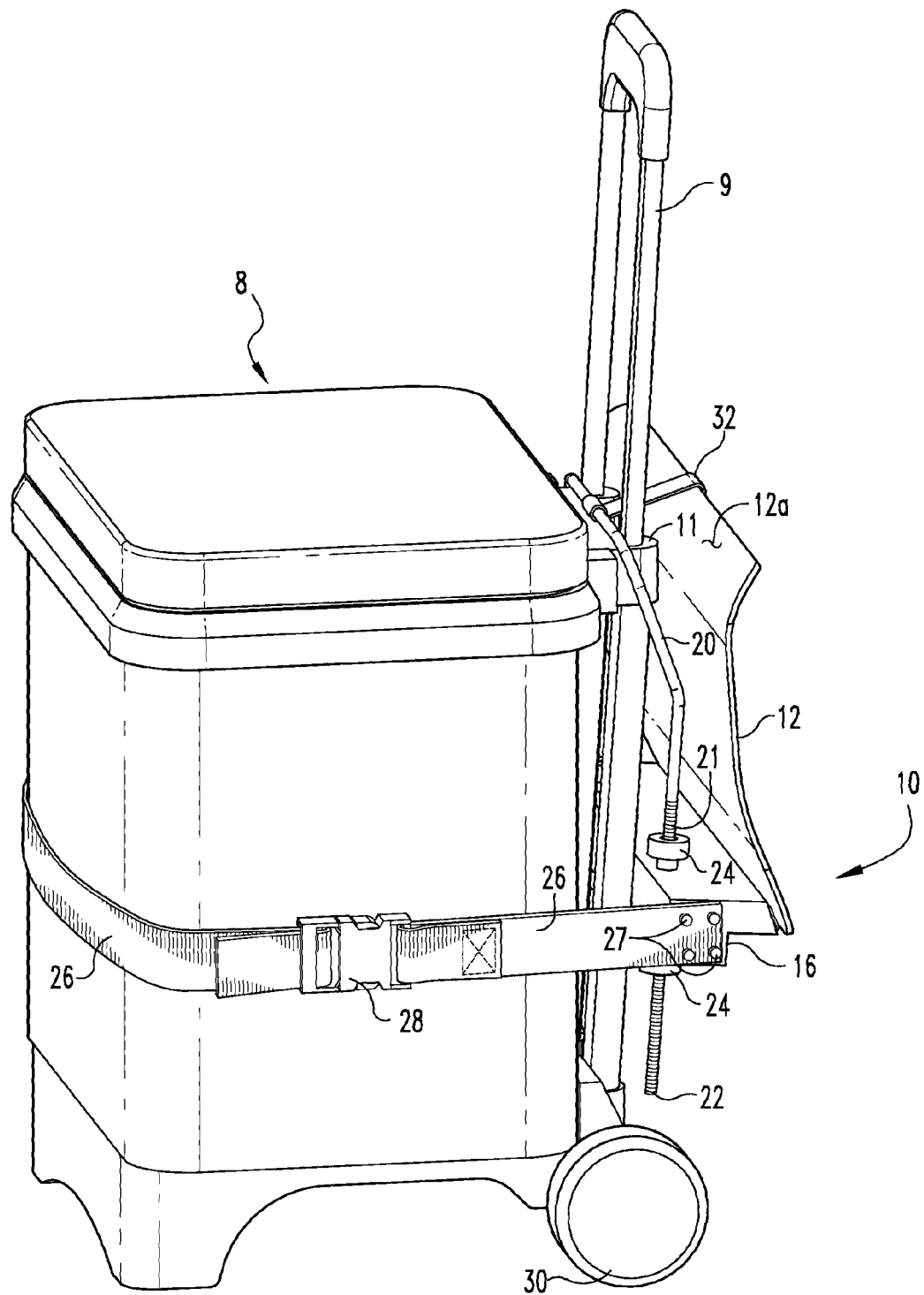
FIG. 2 is a perspective view of the ski attachment of FIG. 1 mounted on a prior art cooler with the ski in a raised position.
Figure 3:
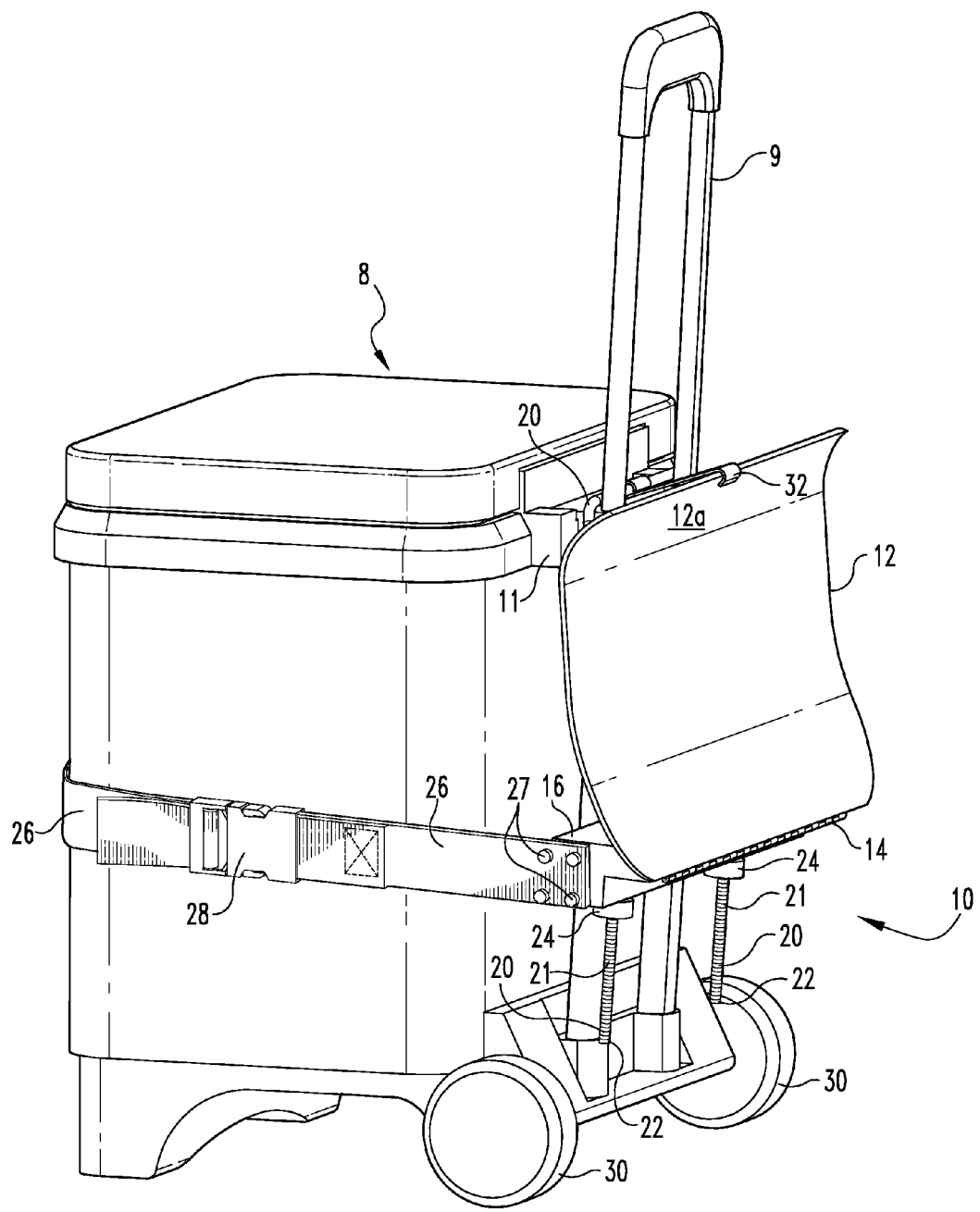
FIG. 3 is another perspective view of the ski attachment of FIG. 2 depicting the ski in a raised position.

Referring now to FIGS. 1, 2 and 3, perspective views of a ski attachment 10 for a portable cooler according to the present invention are shown. In each of FIGS. 1-3, ski attachment 10 is shown mounted on a portable cooler 8 of the prior art. Ski attachment 10 includes a ski or sled 12 attached to hinge 14 by screws 15. Ski 12 is also similar in form and function to a snowboard. Ski 12 is pivotally positionable into a lowered position (as shown in FIG. 1) and a raised position (as shown in FIGS. 2 and 3). Hinge 14 is attached to horizontal support member or bracket 16 using screws 17. Bracket 16 is a beam of rigid material. Bracket 16 includes apertures at 18 through which the free ends of u-shaped rod 20 are inserted. Rod 20 has an inverted u-shape and includes free ends 22 that extend downward and through apertures at location 18 in bracket 16. The free ends 22 of rod 20 include machine threads that mate with internal threads of knobs 24. Knobs 24 are screwed onto and positioned on rod 20 above and below bracket 16 to maintain bracket 16 in position. Knobs 24 functionally enable vertical positioning of bracket 16 with respect to cooler 8. Knobs 24 are adjusted so that bracket 16 is positioned at an operationally ideal location with respect to portable cooler 8 with the curved portion 12a of ski 12 situated adjacent and beneath wheels 30 when ski 12 is in the lowered position shown and with the horizontal portion of rod 20 vertically resting on handle bracket 11 of cooler 8. Flexible strap 26 is attached to horizontal bracket 16 at locations 27 and extends about the periphery of cooler 8. Strap 26 includes a buckle 28 for removably securing ski attachment 10 to cooler 8.

Operationally speaking, to mount ski attachment 10 on cooler 8 the user must first position the u-shaped portion of rod 20 over vertically extendable handle 9 of cooler 8. Next, knobs 24 are rotated so that bracket 16 is horizontally oriented and vertically positioned on rod 20 at an optimal height so that curved portion 12a of ski 12 is adjacent and beneath wheels 30 of cooler 8 when ski 12 is in the lowered position shown in FIG. 1. Finally, flexible strap 26 is positioned about the lateral vertical surfaces of cooler 8, and strap 26 is adjusted and buckle 28 is secured so that strap 26 firmly grips the exterior of cooler 8. Once attached to cooler 8, ski attachment 10 enables the user to grasp handle 9 and tilt cooler 8 onto the curved portion 12a of ski 12 and drag the entire assembly over very loose soil such as sandy areas typically found at beach destinations.

When the sandy ground has been traversed and transport of the assembly shown in FIG. 1 over more solid ground is desired, ski 12 is pivoted into a raised position (as shown in FIGS. 2 and 3) and latch 32 is positioned to retain ski 12 in a raised position. Wheels 30 of cooler 8 then provide a wheeled movement mechanism between cooler 8 and the surface or ground beneath cooler 8.

Removal of ski attachment 10 from cooler 8 is achieved by unbuckling buckle 28 and lifting ski attachment 10 so that u-shaped rod 22 is readily removed and lifted up and over handle 9.

Hinge 14 is a piano hinge though it is contemplated that any style hinge would be a suitable substitute therefor. Bracket 16 is constructed of wood, plastic, bent metal or other suitable material having sufficient rigidity and strength to support the weight of ski 12 and enable attachment of bracket 16 via strap 26 to the exterior of cooler 8. Ski 12 is constructed of light weight material such as plastic, resins or the like though light weight metals would also be suitable materials therefor. Buckle 28 may be replaced by hook and loop fasteners attached to a flexible strap 26 having sufficient length to encircle the periphery of cooler 8. It is also contemplated that rod 20 may be replaced by c-shaped clips, hooks or thumb screw clamps to attach bracket 16 to cooler handle 9, with the ultimate objective being convenient tool free installation of and removal of device 10 from cooler 8. An elastic strap with suitable hooks may be substituted for latch 32. Alternatively, a screen door latch may be substituted for latch 32.

Figure 4:
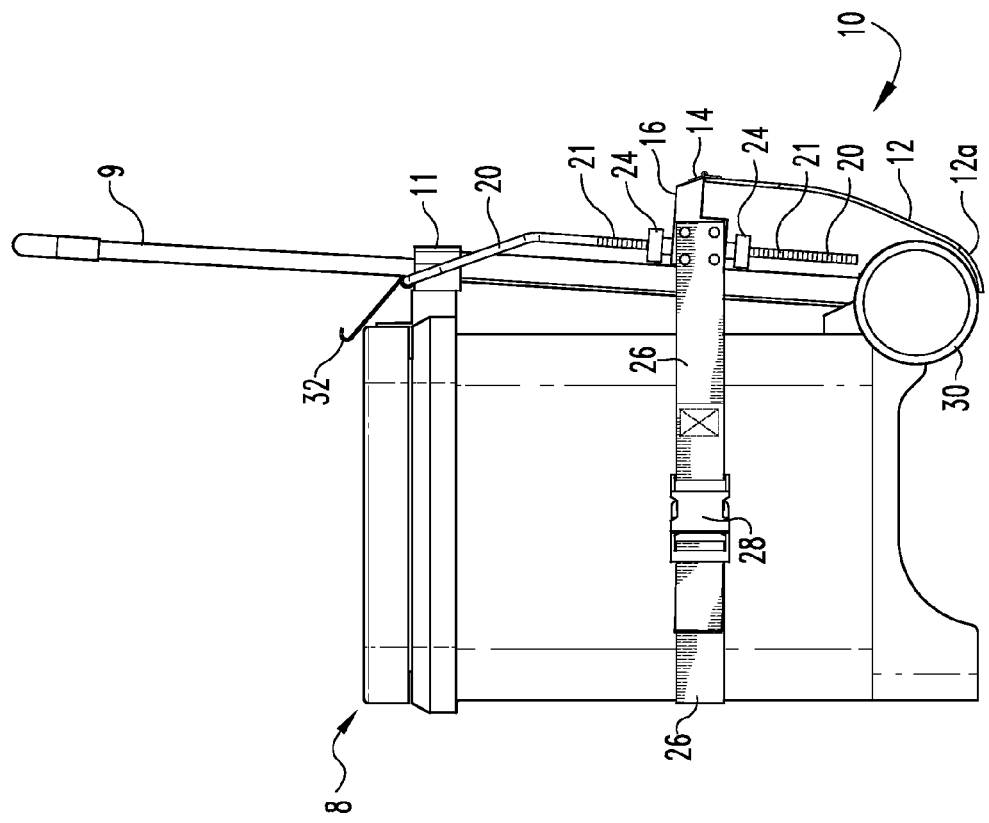
FIG. 4 is a side elevational view of the ski attachment of FIG. 1 with the ski in a lowered position.

Referring now to FIG. 4, a side elevational view of ski attachment 10 attached to cooler 8 is shown. Rod 20 rests upon handle bracket 11 in an ideal installation of device 10 onto cooler 8. Ski 12 is shown in the lower position adjacent wheels 30 in a position whereby cooler 8 will rest upon curved portion 12a of ski 12 when handle 9 is grasped and cooler 8 is tilted over wheels 30. Transport of cooler 8 over sandy soil is then readily achieved by dragging cooler 8 on top of ski 12. Strap 26 and buckle 28 secure support bracket 16 in position in a location between the top and bottom of cooler 8. Knobs 24 enable positioning bracket 16 at a desired height by way of rotation of knobs 24 on threaded portions 21 of rod 20. Also shown are hinge 14 and latch 32.

Figure 5:
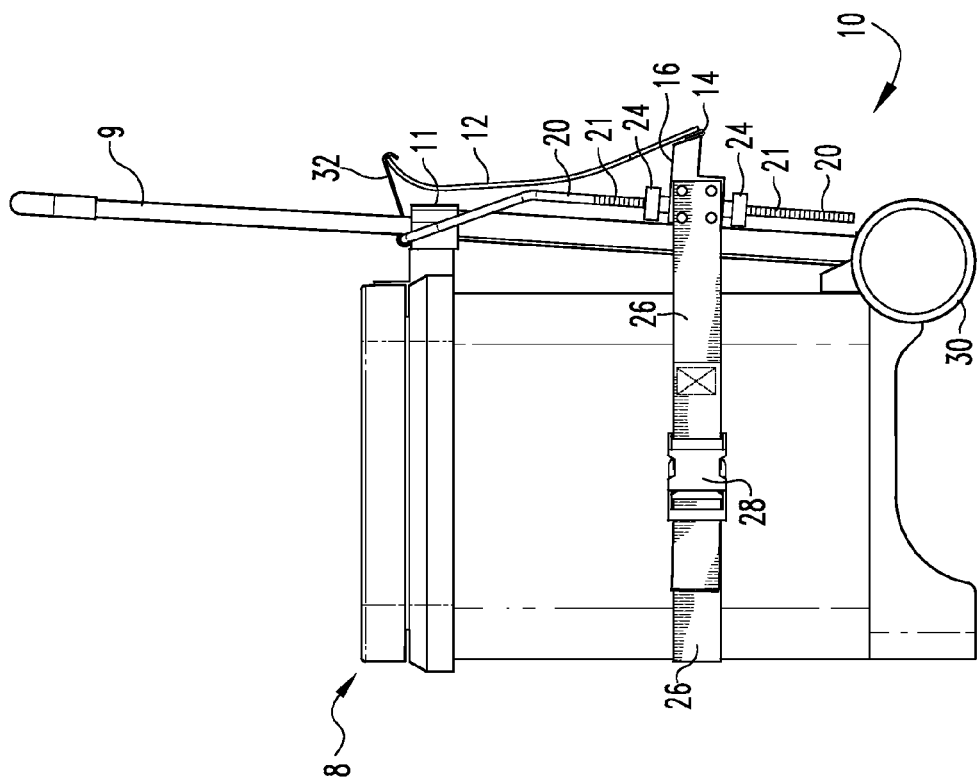
FIG. 5 is a side elevational view of the ski attachment of FIG. 1 with the ski in a raised position.

Referring now to FIG. 5, ski attachment 10 is shown with ski 12 in a raised position. The raised position of ski 12 enables transport of cooler 8 on wheels 30 over solid ground. Latch 32 is rotated about rod 20 into position to engage ski 12 and retain ski 12 in the raised position as shown. Rod 20 is shown positioned about and over handle 9. Bracket 16 is secured to cooler 8 via strap 26 and buckle 28 while knobs 24 are rotated to position bracket 16 at the desired height with respect to cooler 8. Ski 12 is pivotally attached to bracket 16 via hinge 14. Rod 20 is again shown resting atop the upper surface of handle bracket 11.

Figure 6:
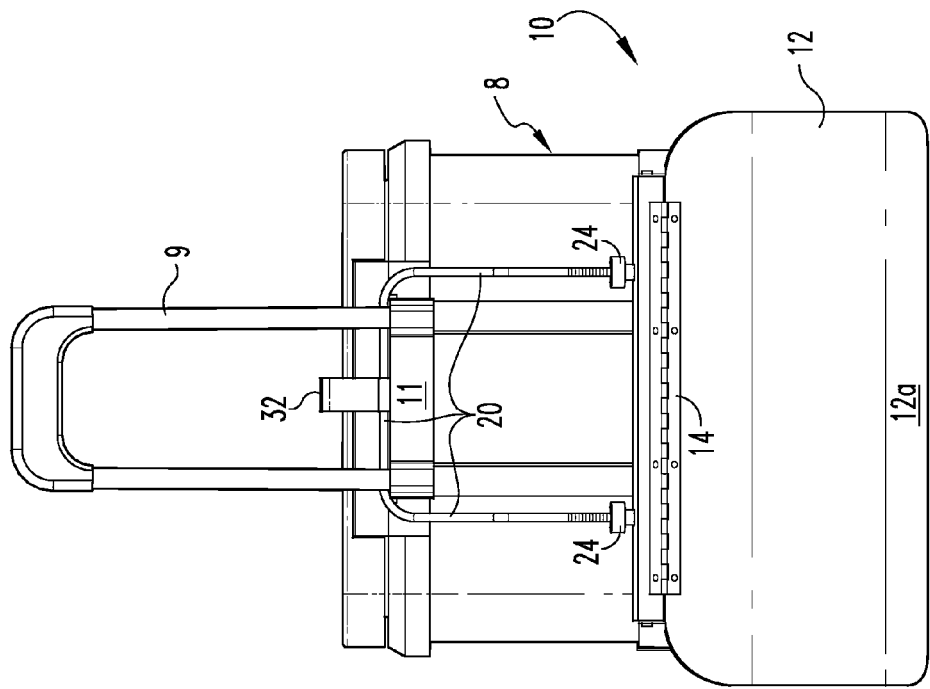
FIG. 6 is a front elevational view of the ski attachment of FIG. 1 with the ski in a lowered position.
Figure 7:
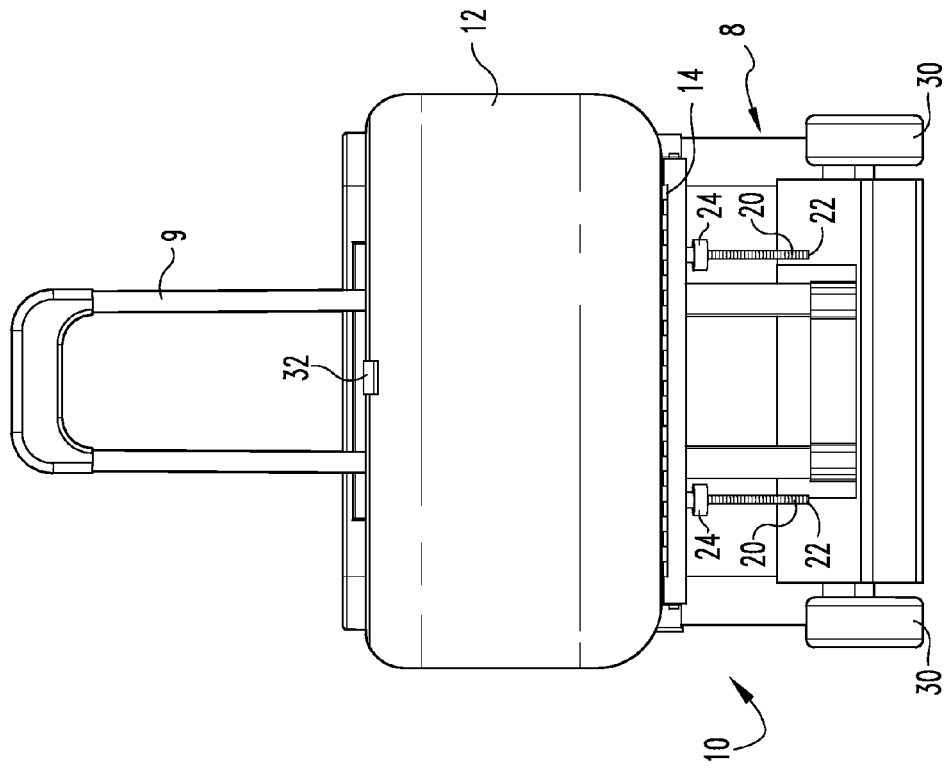
FIG. 7 is a front elevational view of the ski attachment of FIG. 1 with the ski in a raised position.

Referring now to FIGS. 6 and 7, a front elevational view of ski attachment 10 is shown mounted on prior art cooler 8 with handle 9 vertically extended. FIG. 6 depicts ski 12 in the lowered position and FIG. 7 depicts ski 12 in the raised position. The width of ski 12 must be at least equal to the horizontal spacing of wheels 30 so that ski 12 when lowered is situated beneath wheels 30. Latch 32, pivotally attached to rod 20, engages ski 12 to retain ski 12 in the raised position as shown in FIG. 7. Also shown are hinge 14, knobs 24, rod 20, rod free ends 22 and bracket 16.

Hose clamps, spring clips or spring loaded pins engaging apertures in rod 20 may be substituted for knobs 24 to achieve the same functionality as knobs 24 and threaded portion 21 of rod 20. With a spring loaded pin, an array of apertures in rod 20 provides height adjustment locations to position bracket 16 and ski 12 with respect to cooler 8. Strap 26 and buckle 28 are not necessary for the proper functioning of ski attachment 10 but are useful to maintain bracket 16 adjacent cooler 8 and prevent ski attachment 10 from pivoting about rod 20 and contacting the ground when ski 12 is in the raised position. The profile curves of ski 12 are numerous and only one is shown, yet just about any ski curve will work with the present invention so long as the curved portion at 12a is implemented. Ski 12 is depicted as having a slight curvature or bend at or near the midpoint between the curved end situated beneath the cooler wheels and the hinge mounting location and it is contemplated the surface of ski 12 may be planar from the hinge attachment location to the curved portion.

While the invention has been illustrated and described in detail in the drawings and foregoing description of the preferred embodiment, the same is to be considered as illustrative and not restrictive in character, it being understood that only the preferred embodiment has been shown and described and that all changes and modifications that come within the spirit of the invention are desired to be protected.

What is claimed is:

1. A ski attachment device for a portable cooler having at least two wheels rotatably mounted beneath the cooler and a vertically extendable rigid handle attached to one vertical side of the cooler and above the wheels, said ski attachment device comprising:
   a beam;
   mounting means attached to said beam for removably mounting said beam on the vertically extendable rigid handle of the cooler, said mounting means situated about and immediately adjacent the vertically extendable rigid handle; and
   ski means for providing a ski surface beneath the wheels of the cooler, said ski means pivotally attached along a horizontal pivot axis to said beam and positionable in a lowered position to provide the ski surface beneath the wheels of the cooler, said ski means also positionable in a raised position whereby the wheels of the cooler contact the ground beneath the cooler.

2. The device of claim 1 further including:
   a flexible strap having a first end and a second end, and wherein said first end and said second end of said strap are attached to said beam, and wherein said flexible strap is horizontally positioned about and firmly securing said beam to the cooler.

3. The device of claim 2 further including:
   latch means attached to said mounting means for removably attaching to said ski means to maintain said ski means in said raised position.

4. The device of claim 3 wherein said ski means is a substantially rectangular planar member having a curved surface along one edge thereof and wherein said curved surface is situated adjacent and beneath the wheels of the cooler when said planar member is pivotally positioned in the lowered position.

5. A ski attachment device for a portable cooler having at least two wheels rotatably mounted beneath the cooler and a vertically extendable rigid handle attached to a vertical surface of the cooler and above the wheels, said ski attachment device comprising:
   a bracket;
   a u-shaped rod having a first free end and a second free end, said u-shaped rod attached to said bracket so that said first free end and said second free end are attached to said bracket, and wherein said first free end and said second free end are spaced apart to receive the handle of the cooler therebetween and further wherein said u-shaped rod and said bracket attached thereto are situated about and adjacent the vertically extendable rigid handle and maintained in position by the rigid handle; and a ski member pivotally attached to said bracket along a horizontal pivot axis, said ski member including a planar portion and a curved portion that defines a partial substantially cylindrical surface that is positionable beneath the wheels of the cooler in a lowered position, said cylindrical portion extending along the underside of the cooler between and beneath the wheels of the cooler in said lowered position, said ski member being positionable in a raised position so that the wheels of the cooler are in contact with a surface beneath the cooler.

6. The device of claim 5 further comprising:

a flexible strap having a first end and a second end, and wherein said first end and said second end are attached to said bracket, and further wherein said flexible strap extends about the periphery of the cooler to retain said bracket adjacent the cooler.

7. The device of claim 6 further comprising:

latch means attached to said u-shaped rod for releasably retaining said ski member in said raised position.

8. The device of claim 7 wherein said flexible strap includes a buckle situated between the first end and second end of said strap.

9. A ski attachment device for a portable cooler having at least two wheels rotatably mounted beneath the cooler and a vertically extendable and retractable rigid handle extending upward from the upper surface of the cooler, said ski attachment device comprising:

a support member;

mounting means attached to said support member for removably attaching said support member to the vertically extendable and retractable rigid handle of the cooler, said mounting means situated about and adjacent the vertically extendable and retractable rigid handle;

a hinge attached to said support member and oriented so that said hinge pivots about a horizontal axis;

a ski member attached to said hinge and pivotable about said horizontal axis of said hinge, said ski member including a curved portion that defines a partial substantially cylindrical surface that is positioned beneath the wheels of the cooler in a lowered position when said ski member is rotated on said hinge, said cylindrical surface extending along the underside of the cooler and beneath the wheels, said ski member being positionable in a raised position so that the wheels of the cooler contact the surface beneath the cooler.

10. The device of claim 9 wherein said mounting means comprises a u-shaped rod having a first end and a second end and wherein said first end and said second end of said rod are attached to said support member and wherein the handle of the cooler is received within said u-shaped rod to position said support member adjacent the cooler.

11. The device of claim 10 including height adjustment means attached to said u-shaped rod for fixing the position of said support member a predetermined distance from the first end and second end of said u-shaped rod.

12. The device of claim 11 including latch means attached to said u-shaped rod for releasably retaining said ski member in said raised position.

13. The device of claim 12 wherein said u-shaped rod includes machine threads and wherein said height adjustment means includes nuts engaging said machine threads and contacting said support member to position said support member at a predetermined location on said u-shaped rod.

* * * * *